Jan. 16, 1968     C. S. McARTHUR     3,363,452
CIGARETTE TESTING SYSTEM

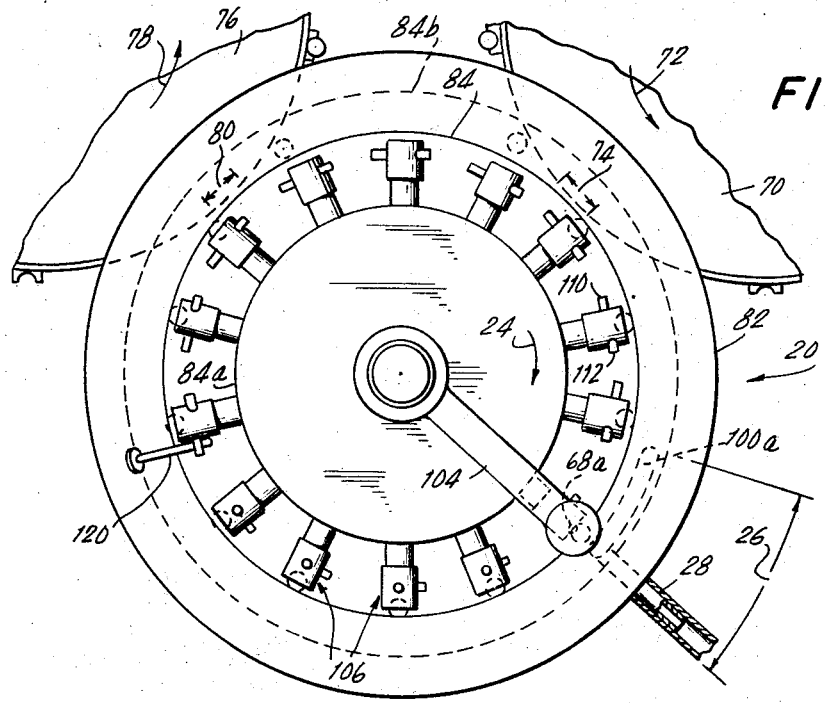

Filed Jan. 20, 1966     3 Sheets-Sheet 3

United States Patent Office 3,363,452
Patented Jan. 16, 1968

3,363,452
CIGARETTE TESTING SYSTEM
Colin S. McArthur, 118 Marian Lane,
Winston-Salem, N.C. 27104
Filed Jan. 20, 1966, Ser. No. 521,840
11 Claims. (Cl. 73—45.2)

ABSTRACT OF THE DISCLOSURE

Cigarette leak testing apparatus wherein cigarettes are sequentially subjected to a gas pressure, and a hot wire testing element detects changes from a normal flow of gas due to a defective cigarette. Response time of the hot wire element is made small by making the diameter of the wire substantially less than 0.001 inch and by controlling the extent of said hot wire in the direction of the flow of gas in the system.

---

This invention relates to the testing of cigarettes and, more particularly, to the testing of cigarettes to determine if such cigarettes have air leaks.

Sherrill Patent No. 2,951,364 shows an apparatus for testing cigarettes for air leaks by passing a flow of air through each cigarette. A mechanical sensing device incorporating a movable member responds to an abnormal air flow, indicating a leak in the particular cigarette under test. In response to movement of the movable member, an ejector mechanism is actuated to eject the defective cigarette. Although mechanical sensing arrangements for detecting abnormal air flow conditions have been suitable in the past, they are nevertheless slow as compared to the speeds available in present cigarette-making machines and the even greater speeds expected in future machines. It is therefore desirable to have a testing arrangement for leak detection that can handle cigarettes at the fast rate at which they may be produced.

Accordingly, it is an object of the present invention to provide for improved inspection of cigarettes for leaks.

A further object of the present invention is to provide for the inspection of cigarettes for leaks through apparatus which is capable of acting at high speeds.

Each cigarette is to be tested is subjected to an internal gas pressure different from the external pressure. Typically, the internal pressure is higher than the external pressure, but it is only necessary that the pressures be different. A hot wire sensor, which is heated by an electric current flowing through it, is exposed to the gas flowing through a conduit of the pressure-applying apparatus. Any of several conduit arrangements may be used, but in all of them the flow conditions existing when a leaky cigarette is being tested are distinguishably different from the flow conditions existing when a cigarette without leaks is being tested. The different flow conditions produce different temperatures at the hot wire. Since a wire having a substantial temperature coefficient of resistance is used, the different temperatures cause differences in current flow through the wire. The different current flows are sensed and amplified, and used to control an apparatus for discarding leaky cigarettes and passing the cigarettes without leaks through to packaging machines.

The hot wire sensors of the present invention must change their temperature rapidly. Hence they must be short and of small diameter. Platinum or Nichrome wire, less than 0.001 inch in diameter, is satisfactory. Wire of tungsten, iron or nickel, e.g., could also be used.

Such a wire sensor is capable of responding separately to each of many cycles of gas flow per second, and hence the testing system of the present invention is able to accommodate speeds presently in use in cigarette-making machines and speeds which are contemplated for the near future. In particular, cigarette-making machines presently are capable of making cigarettes at the rate of approximately 1,000 dual cigarettes per minute or 17 dual cigarettes per second. The sensor of the present invention is capable of testing cigarettes at this rate and indeed at much higher rates.

The invention will be more completely understood by reference to the following detailed description. In the drawings:

FIG. 2 is an end view of cigarette-conveying apparatus incorporating means for subjecting the cigarettes to a source of gas for inspection for leaks.

FIG. 3 is a side view of the apparatus of FIG. 2.

FIGS. 4, 5, 6 and 7 are sectional views of portions of the apparatus shown in FIG. 3, taken along the section lines 4—4, 5—5, 6—6 and 7—7 of FIG. 3 and looking in the directions of the corresponding arrows in that figure.

Figure 8:
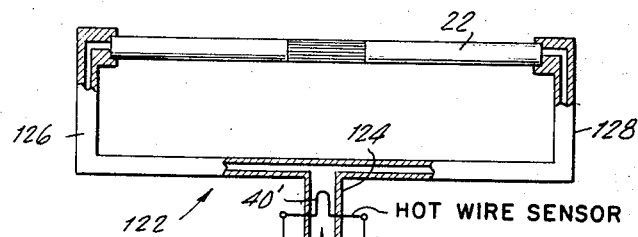
Figure 9:
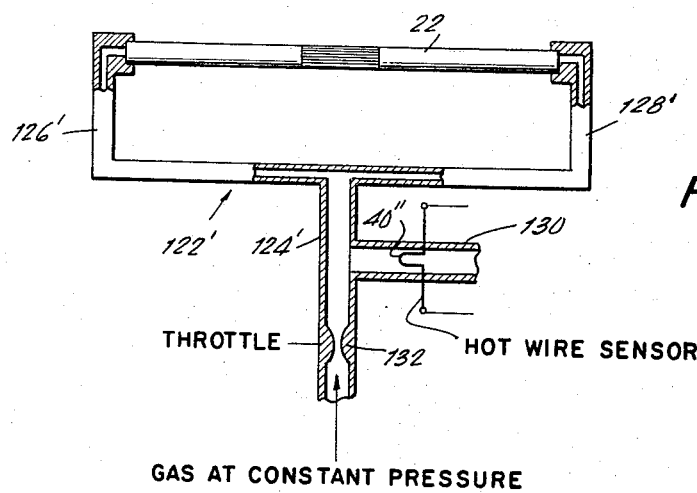

FIGS. 8 and 9 are simplified views of two alternative leak testing arrangements in accordance with the invention.

Figure 1:
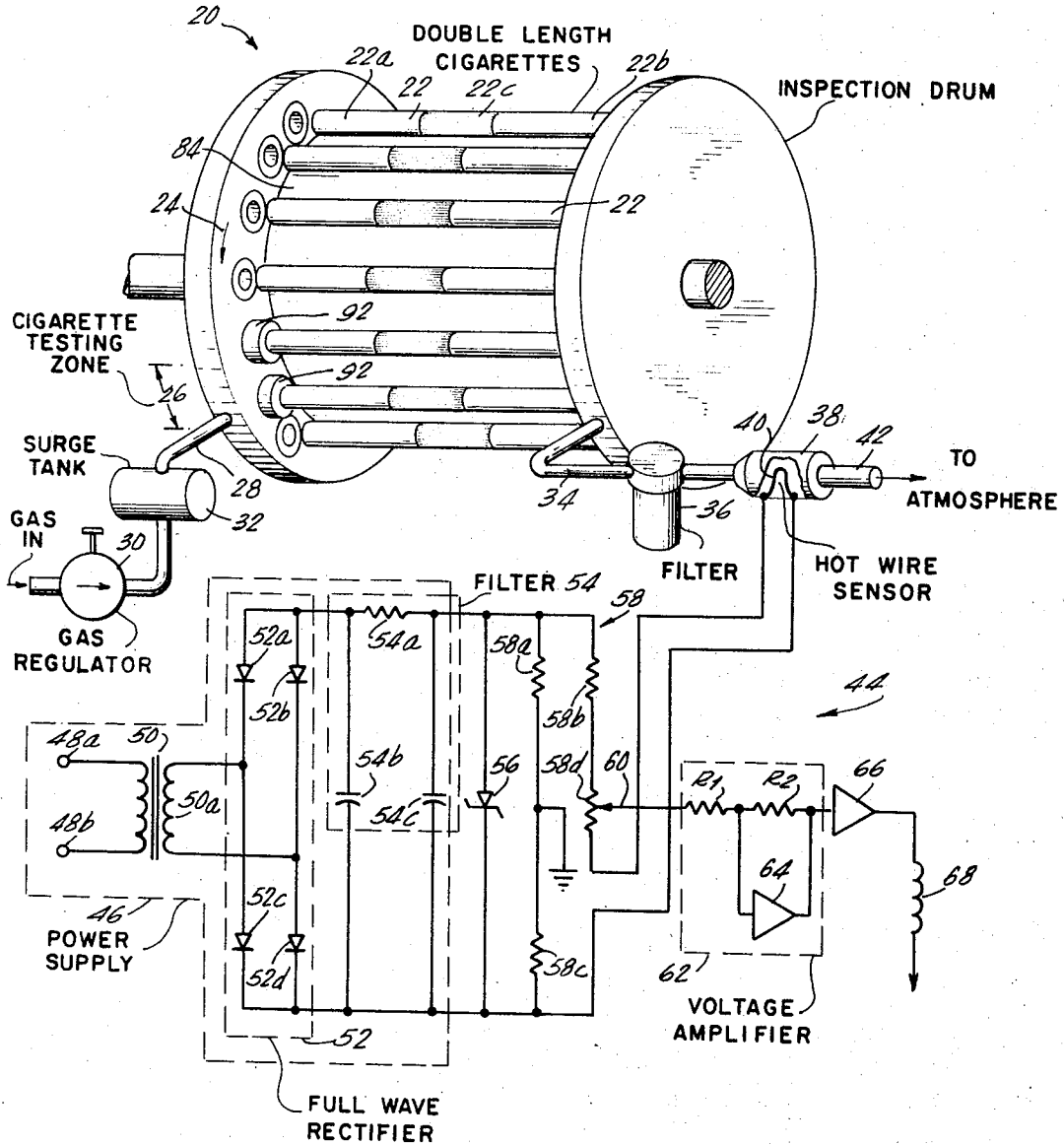
FIG. 1 illustrates a testing system embodying the invention, partly as a simplified perspective view of apparatus and partly as a schematic wiring diagram of circuitry connected to the apparatus.
Figure 6:
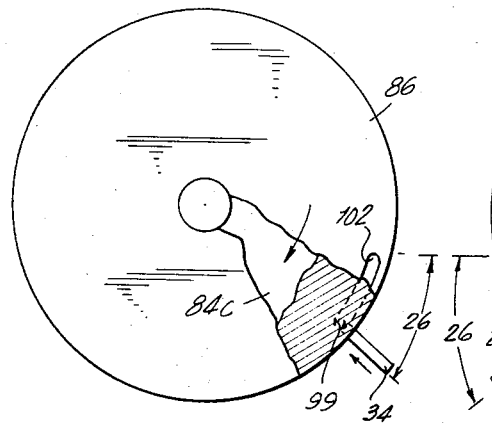

Referring to FIG. 1, a conveyor such as a drum assembly 20 is shown carrying a plurality of double length cigarettes 22 (cigarette assemblies) thereon, each of which is to be inspected for leaks. Each dual cigarette typically comprises tobacco-filled portion 22a and 22b at the ends thereof separated by a double length filter section 22c in the middle thereof and fastened together by means of tipping paper and adhesive. Subsequently, each double length cigarette is cut in the middle of filter section 22c to produce two standard filter-type cigarettes. As employed herein, the term "cigarette" is a generic term inclusive of a filter cigarette or a nonfilter cigarette, as well as a single length or multiple length cigarette. The term is also intended to include any self-contained smoking article, such as a cigar, which may be tested in accordance with the invention.

The cigarettes are applied to and removed from the drum assembly 20 by apparatus explained in more detail below in connection with FIGS. 2 and 3. The drum assembly 20 is represented only diagrammatically in FIG. 1; it is shown in more detail below in FIGS. 2-7.

The drum assembly rotates as shown by arrow 24. As each cigarette carried on the drum assembly passes through a testing zone 26, gas (typically air) under constant pressure greater than ambient pressure is applied to the cigarette from a conduit 28. The conduit 28 is normally connected to a source of gas under pressure (not shown) through a regulator 30 and a surge tank 32 to maintain the flow of gas constant. A slip ring arrangement described in detail in connection with FIGS. 2 and 3 couples the conduit 28 to each cigarette as it passes through the testing zone 26.

Gas flows through the cigarette in the testing zone and out of the cigarette and into an outlet conduit 34 connected to a filter 36. The filter filters out any tobacco that may be present in the gas. The gas then flows through a container 38 containing a hot wire sensing element 40 therein. The gas is thereafter expelled to the atmosphere through an outlet 42, which may include a restriction therein (not shown) to limit flow rate.

The sensing element 40 is electrically connected in a circuit 44 shown in the lower half of FIG. 1. The circuit includes a power supply 46 having input terminals 48a and 48b connected to a source of alternating potential. A transformer 50 transforms the alternating potential to a suitable value at secondary 50a, which is connected to a full wave bridge rectifier 52 formed from diodes 52a, 52b, 52c and 52d. The full wave rectified output signal is applied to a pi-type filter 54 consisting of a resistor 54a and capacitors 54b and 54c which smooth the rectified signal. The output signal from the filter 54 is in turn applied to a Zener diode 56 which serves to hold the output potential of the filter constant. The potential across the Zener diode is coupled to a bridge circuit 58 which includes fixed resistors 58a, 58b and 58c, and a variable resistor 58d, as well as the sensing element 40. The variable resistor 58d includes a movable contact 60 which is connected to a voltage amplifier 62 comprising resistors R1 and R2 and an operational amplifier 64 connected across the resistor R2. The gain of the operational amplifier 64 is advantageously chosen to be substantially equal to R2/R1. Output signals from the voltage amplifier 62 are applied to a power amplifier 66 and thence to a relay winding 68 which when energized serves to reject a cigarette from the drum assembly 20, as will be explained in more detail below in connection with FIGS. 2 and 3.

In the circuit of FIG. 1, a predetermined current flows through the sensing element 40 as determined by the resistances of the sensing element and the resistors 58a, 58b, 58c and 58d, as well as by the voltage applied to the bridge 58. The setting of the variable contact 60 is chosen so that, with the normal gas flow past the sensing wire 40, i.e., the rate of flow of gas encountered when a normal, nonleaky cigarette is in the flow path, the signal at the contact is substantially at ground or some other reference potential, and no output signal is generated by the power amplifier 66.

If there is a change in gas flow from the normal value, such as occasioned by a leak in a cigarette under test, less gas flows through the container 38, and the sensing element 40 accordingly increases in temperature. This increase in temperature produces a corresponding increase in resistance of the sensing element which unbalances the bridge circuit 58 and produces a signal at the variable contact 60. This signal is amplified by the amplifiers 62 and 66, thereby energizing the relay coil 68. Energization of the relay coil causes the cigarette under test to be rejected from the drum and channelled to a special reject area, as explained below.

In this fashion, the cigarettes on the drum are tested one by one as each passes through the testing zone 26. The sensing element 40 must be able to respond to rapid changes in gas flow. With present cigarette-making machinery, cigarettes are normally produced at the rate of approximately 1,000 dual cigarettes per minute or 17 dual cigarettes per second. The sensing wire 40, if of sufficiently small diameter, is able to easily respond separately to each cycle of gas flow occurring at this or even greater rates. Typically, the sensing element comprises a platinum or Nichrome wire roughly 0.0004 inch in diameter. It is believed that the diameter of the wire should be less than 0.001 inch in order to respond sufficiently rapidly so as to enable 17 or more cigarettes to be tested per second. In the testing arrangement, gas pressure is advantageously less than 50 inches of water so as to prevent the cigarettes from being damaged by unduly high testing pressures. The wire may be in the form of a loop as shown, or it may be a straight wire segment, a mesh, a zig-zag or other configuration. If in the form of a loop, the presently preferred arrangement is for the plane of the loop to be transverse to the direction of air flow. In this regard, it is desirable to have the dimension of the loop in the direction of air flow substantially smaller than the length of pulses of gas when move past the loop. This dimension is at a minimum when the plane of the loop is transverse to the direction of air flow. However, if the loop is sufficiently small, then it can be parallel to the direction of air flow.

FIGS. 2–7 show in greater detail the construction of the drum assembly 20 shown in diagrammatic form in FIG. 1. In FIG. 2, the drum assembly 20 is adapted to receive a series of cigarettes from a drum assembly 70.

The drum assembly 20 rotates clockwise, as shown by arrow 24, while the drum assembly 70 rotates counterclockwise, as shown by arrow 72. The surfaces of the drum assemblies pass tangentially adjacent to each other at a cigarette transfer zone 74, and cigarettes are transferred from the drum assembly 70 to the drum assembly 20, as described in greater detail below. The cigarettes transferred to the drum assembly 20 are thereafter tested as they pass through the testing zone 26 and are either rejected as being defective or are retained on the drum. Those cigarettes retained on the drum are thereafter transferred to a further drum assembly 76 which rotates counterclockwise as shown by arrow 78. Cigarettes are transferred to the drum assembly 76 in transfer zone 80, as described below.

As shown in FIG. 3, the drum assembly 20 comprises a fixed head 82 which serves to mount the drum assembly to a frame (not shown). Journalled within the head 82 is a rotatable drum 84 which extends at one end through the fixed head 82 as a reduced diameter portion 84a. The drum 84 also includes an intermediate stepped portion 84b and an end flange 84c. Another fixed head 86 abuts the end flange 84c.

The drum 84 carries a plurality of rows of cradles 88 therein, the rows being arranged around the circumference of the drum upon its outer surface. Each cradle 88 is advantageously concave and semicylindrical so as to cradle a portion of the cylindrical surface of one of the cigarettes 22 carried on the drum. The central pair of cradles 88 in each row are connected together to form an elongated cradle 88a which receives the cylindrical surface of substantially the entire filter portion 22c of the double length cigarette in the row.

Each cradle 88 has a central orifice 90 opening underneath the cigarette in the cradle. Each of the central elongated cradles 88a has a pair of such orifices. Orifices 90a are also included in the drum 84 in each row of orifices 90. Internal passageways (not shown) within the drum 84 selectively connect (by appropriate valve action) the orifices 90a to a positive source of gas (typically air) pressure and the orifices 90 to a source of vacuum. Thus each cigarette 22 on the surface of the drum 84 is either ejected from the cradles 88 by positive gas pressure applied to the orifices 90a or retained on the cradles by vacuum applied to orifices 90.

In this regard, the surfaces of the drum assemblies 70 and 76 are similarly formed with cradles and orifices to retain the cigarettes on or eject the cigarettes from the cradles. In the system of FIG. 2, as each cigarette on the drum 70 enters into the transfer zone 74, it is subjected to a positive gas pressure ejecting that cigarette from the cradles on that drum onto the cradles of the drum 84. At the same time, the orifices 90 in the cradles 88 on the drum 84 within the transfer zone 74 are subjected to a vacuum to receive the cigarette from the drum 70 and to retain the transferred cigarette on the surface of the drum 84. In like fashion, orifices 90a on the drum 84 when in the transfer zone 80 are subjected to positive gas pressure and the orifices in the cradles on the drum 76 are subjected to vacuum to transfer cigarettes from the drum 84 to the drum 76.

As shown in FIGS. 3 and 4, the intermediate stepped portion 84b of the drum 84 includes a plurality of holders 92. Each holder is mounted within a corresponding passage 93 and may be reciprocated in the directions indicated by arrow 94 (FIG. 4) by a driving mechanism (not shown) in the drum 84. When a cigarette is transferred from the drum 70 to the drum 84 as described above, the holder 92 on the drum 84 positioned in the transfer zone 74 is in a retracted position within the drum portion 84b. After the cigarette is transferred to the drum 84, the holder 92 is moved outwardly to the position shown in FIGS. 3 and 4 to engage one end of the cigarette 22 transferred to the drum 84. In so engaging the cigarette end, the cigarette is moved slightly to the right with respect to FIG. 3 so that the other end theerof is firmly engaged by surface 96 of the drum flange 84c (FIG. 5).

As shown in FIGS. 3 and 4, each cigarette holder 92 includes a passage 92a therein that communicates with a passage 98 in the drum portion 84b. Similarly, each contact area of the drum flange 84c (FIG. 5) engaging an end of a cigarette communicates with a passage 99 in the drum flange. It will be noted, then, that the passages 98 and 92a communicate with one end of the cigarette, and the passage 99 communicates with the other end of the cigarette. These passages are provided for subjecting the cigarette to a flow of gas for leak testing as described immediately below.

Figure 7:
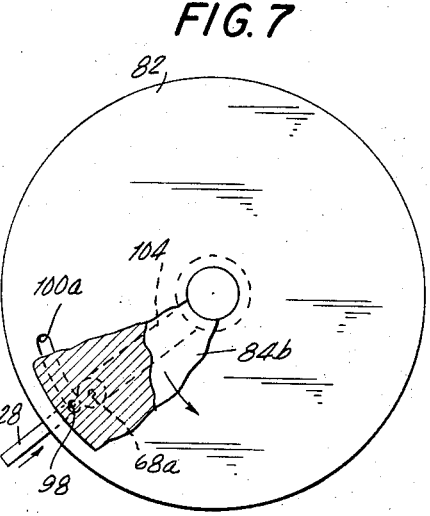

Gas input conduit 28 is shown in FIG. 3 as mounted on the fixed head 82. FIG. 4 shows that conduit 28 communicates with a passage 100 within the fixed head 82. The passage 100 terminates in a portion 100a that is shown in FIG. 7 as subtending an angle of roughly 25° of rotation of the drum 84. The angular extent of the passage 100a defines the extent of the cigarette testing zone 26. At the other end of the drum 84, as shown at the right-hand side of FIG. 3, the gas outlet conduit 34 is connected to the fixed head 86. As shown in FIG. 5, the outlet conduit 34 communicates with a passage 102 in the fixed head. As will be noted from FIG. 6, the passage 102 subtends the same angle as the passage 100a and is located directly opposite the passage 100a.

The passages 100a and 102 in the fixed heads 82 and 86 are positioned so as to communicate with the passages 98 and 99 in the drum portions 84b and 84c. Hence, during the portion of the revolution of the drum 84 in which the passage 98 leading to a particular cigarette holder 92 communicates with the passage 100a, gas under pressure is provided via the passages 28 and 98 to that cigarette. The gas flows through the cigarette and into the associated passage 99 in the flange 84c at the other end of the drum, and flows out of that passage into the passage 102 and thence into the outlet conduit 34 to the filter 36 and sensing element 40 shown in FIG. 1.

Thus as each cigarette passes through the testing zone 26, it is subjected to a flow of gas therethrough. If the cigarettes are all of uniform draft, the flow of gas will be constant. However, if any one of the cigarettes has a leak therein, the gas flow will change, thereby changing the temperature of the sensing element 40 and its resistance, and causing the relay 68 of FIG. 1 to be energized as explained above.

With respect to FIG. 2, if the angular extent of the testing zone 26 is less than the angular separation of adjacent rows of cradles 88 on the drum 84, then after each cigarette passes out of the testing zone, there is a short period of time before the next cigarette enters the testing zone. Hence the flow of gas through the outlet and past the hot wire sensor 40 is comprised of a series of pulses of gas. In the circuit of FIG. 1, the relay 68 remains unenergized during normal pulse flows of gas past the hot wire sensor 40. A leakage condition in one of the cigarettes, however, causes a change in the quantity of gas making up the associated gas pulse, and the hot wire sensor detects this change. The angular extent of the testing zone 26 may also be the same as or slightly greater than the angular separation of adjustment rows of cradles 88 on the drum 84. In this case, as each cigarette passes out of the testing zone the next cigarette passes into the zone, thereby producing a relatively uninterrupted flow of gas past the sensing element 40 except for leaks in the cigarettes, which are detected as explained above.

Referring to FIG. 3, the relay 68 is carried within a housing 104. The relay controls a plunger 68a which, when the relay is energized, may actuate that one of a plurality of valve operators 106 which happens to be passing plunger 68a on the rotating drum portion 84a. The valve operators 106 control the application of vacuum to the orifices 90 and pressure to the orifices 90a so as to cause the cigarettes in the cradles to be retained upon the drum or to be ejected therefrom. Each of the valve operators 106 is associated with a corresponding one of the rows of cradles 88, and is rotatable on its own longitudinal axis. Each valve operator includes a spindle 108 to which are attached a pair of radial fingers 110 and 112.

The relay housing 104 is so positioned and the relay plunger 68a has an axial movement of sufficient length so as to intercept any finger 112 passing by when the plunger 68a is in its extended position, but adapted to clear any finger 112 passing by when the plunger is in a retracted position. The setting of the valve operators 106 is undisturbed as the drum 84 rotates until an electrical signal to the relay 68 causes the plunger to be extended, as shown in FIG. 3, so as to intercept the finger 112 then in proximity to or next coming into proximity to the plunger 68a, thereby to rotate 90° the valve operator 106. The valving action of the valve operator 106 is such that the 90° turn thereof acts to switch the orifices 90 associated therewith from a normal gas vacuum condition and to apply a positive gas pressure to the associated orifices 90a. This action tends to eject the associated cigarette from the cradles 88.

It will be noted from FIG. 7 that the relay plunger 68a is positioned at the bottom region of the testing zone 26. Hence each cigarette tested in the zone and detected as leaking, thereby causing the relay 68 to be actuated, is ejected from the surface of the drum 84. It should be noted in this connection that each of the cigarette holders 92 is moved to its retracted position after the cigarette has passed through the testing zone 26 so that the associated cigarette may be ejected following the test or may be transferred to the drum 76 as explained below.

Referring again to FIG. 2, a finger 120 is fixed to the head 82. The finger is adapted to intercept the finger 110 on any valve operator 106 that is not in the vacuum position. Hence each of the valve operators which has been actuated by the relay plunger 68a to eject its associated cigarette is moved to the vacuum position for proper operation in the next cycle of operation when a cigarette is again received from the drum 70 for testing.

Those cigarettes passing through the testing zone 26 and not ejected from the surface of the drum 84 continue to be retained on the drum until they reach the transfer zone 80 (FIG. 2). In the transfer zone 80, the vacuum supplied to the orifices 90 in the cradles 88 is temporarily removed by means of a valving arrangement (not shown) so that the cigarettes may be transferred to the drum 76.

As described above, the system of FIGS. 1–7 provides for a flow of gas through each cigarette. The sensing wire 40 is advantageously located in the outlet line, and hence requires a filter to remove tobacco from the gas. It is not desirable to position the sensing element on the inlet line inasmuch as total gas flow is detected there. A leakage condition causes a smaller percentage change in flow at the inlet than at the outlet since outlet flow is reduced by the leakage. It may be desirable, however, not to sense "dirty" gas that has passed through a cigarette, and the alternative embodiments of FIGS. 8 and 9 are intended to operate by sensing "clean" gas prior to its application to the cigarettt under test.

Referring to FIG. 8, gas under constant pressure is applied to a branched conduit 122. The common leg 124 of the conduit contains sensing element 40', while legs 126 and 128 are coupled to opposite ends of cigarette 22. Depending upon the imperviousness of the cigarette paper to the flow of gas therethrough, little or no gas flows through the common conduit leg 124 unless there is a leak in the cigarette. The sensing element 40' detects a change in air flow from the normal flow associated with a nondefective cigarette and generates a signal which may be employed in a circuit the same as that shown in FIG. 1.

FIG. 9 shows a similar arrangement involving a branched conduit 122'. Legs 126' and 128' are coupled to opposite ends of cigarette 22, and common conduit leg 124' is coupled to a source of gas under constant pressure. A second conduit 130 is coupled into the common conduit leg 124' and is typically vented to the atmosphere. Sensing element 40" is positioned within the second conduit 130. The conduit leg 124' advantageously includes a throttle or restriction 132 therein. When there is no leak in the cigarette 22, the flow of gas through the restriction 132 creates a reduction in pressure, and the gas flow past the sensing element 40" is maintained at a fixed rate. When there is a leak in the cigarette under test, the rate of gas flow through the restriction increases and the pressure in the conduit 130 decreases to a lower value, thereby reducing the rate of flow of gas past the sensing element and resulting in an increased temperature of the element. The increased temperature produces a corresponding increase in resistance which is sensed by a system the same as that of FIG. 1.

It will be noted that various embodiments of the invention have been described for the testing of cigarettes for draft. Arrangements involving a normal flow of gas through the cigarette and other arrangements involving little or no normal flow through the cigarette have been described. Each arrangement provides a gas pressure in the interior of a cigarette different from the pressure outside the cigarette so that any leaks in the cigarette will cause a flow of gas, e.g., to the outside of the cigarette from within the cigarette. A hot wire sensor is employed as a testing element to detect changes in gas flow, indicating cigarette leakage. The invention employs a tube means for providing the different gas pressure in the interior of each cigarette under test. In FIG. 1, the elements 28, 92, 34, 36, 38, and 42, all form part of such a tube means. In FIG. 8, the conduit segments 124, 126, and 128 all form part of such a tube means. In FIG. 9, the conduit segments 124', 126', 128', and 130 all form part of such a tube means. The invention is susceptible to modification, and hence should be taken to be defined by the following claims.

What is claimed is:
1. Cigarette testing apparatus for testing cigarettes for leaks and capable of testing at rates in excess of 1,000 cigarette assemblies per minute, comprising:
   (a) a testing station,
   (b) means for supplying cigarettes sequentially to and removing cigarettes sequentially from said testing station,
   (c) tube means for coupling the interior of each cigarette at the testing station to gas under a pressure different from the pressure outside the cigarette,
   (d) a wire having a diameter substantially less than 0.001 inch and a substantial temperature coefficient of resistance positioned within said tube means, the diameter of said wire and the extent of said wire in the direction of gas flow being chosen sufficiently small so as to permit the wire to change appreciably in temperature in response to a changing gas flow past the wire and rapidly enough to respond to gas flow changes taking place at the cigarette testing rate,
   (e) means for passing a current through said wire so as to heat the wire, and
   (f) means responsive to the resistance of the wire for generating a signal representative of said resistance and thus of the temperature of the wire representing the gas flow for each cigarette under test.

2. Cigarette testing apparatus as defined in claim 1, wherein said tube means provides a gas flow through said cigarette from one end to the other end when the cigarette has no leaks.

3. Cigarette testing apparatus as defined in claim 1, wherein said tube means includes means for holding both ends of the cigarette and applying gas under pressure to both ends of said cigarette.

4. Cigarette testing apparatus as defined in claim 1, wherein said tube means comprises a branched conduit having a common leg coupled to a source of gas and two branch legs coupled to opposite ends of the cigarette, said wire being positioned in said common leg of the conduit.

5. Cigarette testing apparatus as defined in claim 1, wherein said tube means comprises a branched conduit having a common leg coupled to a source of gas and two branch legs coupled to opposite ends of the cigarette, a second conduit coupled to said common leg, said wire being positioned in said second conduit.

6. Cigarette testing apparatus as defined in claim 1, wherein said wire is of platinum, tungsten, iron, nickel or Nichrome.

7. Cigarette testing apparatus as defined in claim 1, wherein said wire is of a diameter substantially in the order of 0.0004 inch.

8. Cigarette testing apparatus as defined in claim 1, wherein said tube means comprises a substantially cylindrical conduit of about the same diameter as that of the cigarette under test.

9. Cigarette testing apparatus as defined in claim 1, wherein said means responsive to the resistance of said wire comprises a bridge circuit having an output connection, said wire being electrically connected in said bridge circuit so that changes in the resistance of said wire produce corresponding changes in the electrical potential of said output connection.

10. Cigarette testing apparatus as defined in claim 9, further including
   (h) means responsive to the potential of said output connection for ejecting a cigarette from a normal conveying path in response to a change in said potential in a sense indicative of a leak in the cigarette.

11. Apparatus for testing cigarettes for leaks as defined in claim 9, wherein said wire has a diameter substantially in the order of 0.0004 inch, and including:
   (a) power supply means for energizing said bridge circuit and producing an electrical potential at said output connection; energization of the bridge circuit causing a current to flow through said wire so as to heat the wire; and
   (b) relay means responsive to the potential of said output connection and energized when said potential changes as a result of a change in the resistance of said wire in a sense indicative of a leak in a cigarette being tested.

References Cited

UNITED STATES PATENTS

| | | | |
|---|---|---|---|
| 2,645,117 | 7/1953 | Bendix et al. | 73—49.2 |
| 2,951,364 | 9/1960 | Sherrill | 73—45.2 |
| 3,068,693 | 12/1962 | Ferran et al. | 73—204 |
| 3,237,444 | 3/1966 | Kaeding et al. | 73—45.1 |
| 3,251,225 | 5/1966 | Luft | 73—204 |

FOREIGN PATENTS

| | | |
|---|---|---|
| 928,743 | 6/1963 | Great Britain. |

LOUIS R. PRINCE, *Primary Examiner.*

JEFFREY NOLTON, *Assistant Examiner.*